United States Patent
Oishi et al.

(10) Patent No.: US 7,518,709 B2
(45) Date of Patent: Apr. 14, 2009

(54) PROCESSING APPARATUS FOR PULSED SIGNAL AND PROCESSING METHOD FOR PULSED SIGNAL AND PROGRAM THEREFOR

(75) Inventors: Masahiro Oishi, Tokyo (JP); Yoshikatsu Tokuda, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 455 days.

(21) Appl. No.: 11/046,349

(22) Filed: Jan. 28, 2005

(65) Prior Publication Data

US 2005/0171712 A1   Aug. 4, 2005

(30) Foreign Application Priority Data

Jan. 29, 2004   (JP)   .............................. 2004-021467

(51) Int. Cl.
*G01C 3/08*   (2006.01)
(52) U.S. Cl. ........................ 356/4.01; 356/5.01; 356/5.1
(58) Field of Classification Search ........ 356/5.01–5.15
See application file for complete search history.

(56) References Cited

U.S. PATENT DOCUMENTS

| | | | |
|---|---|---|---|
| 3,810,029 A | 5/1974 | Barthelemy | |
| 3,940,766 A | 2/1976 | Ctoss et al. | |
| 5,926,260 A * | 7/1999 | Dunne et al. | 356/5.05 |
| 6,430,368 B1 * | 8/2002 | Hata | 396/79 |
| 6,747,592 B2 * | 6/2004 | Nakamura | 342/70 |
| 7,023,376 B1 * | 4/2006 | Kuroda et al. | 342/70 |

FOREIGN PATENT DOCUMENTS

| | | |
|---|---|---|
| EP | 0 654 682 | 5/1995 |
| EP | 1 321 740 | 6/2003 |
| GB | 2 270 437 | 3/1994 |
| JP | 2000-506971 A | 6/2000 |
| JP | 3089332 | 7/2000 |
| WO | WO 97/33182 | 9/1997 |

* cited by examiner

*Primary Examiner*—Isam Alsomiri
(74) *Attorney, Agent, or Firm*—Brinks Hofer Gilson & Lione

(57) ABSTRACT

A distance measuring apparatus using a pulse laser light which has a wide measurement range and can execute high speed operation. The apparatus emits a pulsed light onto an object, receives a reflected pulsed light by a light receiving element, and amplifies an output thereof by a tuning amplifier. A sampling data of a damped oscillation wave form responding to the reflected pulsed light output from the tuning amplifier is added so as to be shifted by one cycle. Accordingly, it is possible to execute an enhancing process of a peak value utilizing a periodicity of the damped oscillation wave form responding to the pulsed signal, and it is possible to improve a detecting sensitivity of the reflected pulsed light.

17 Claims, 10 Drawing Sheets

First light emission

Second light emission

First light emission

Second light emission

First light emission

Second light emission

PROCESSING APPARATUS FOR PULSED SIGNAL AND PROCESSING METHOD FOR PULSED SIGNAL AND PROGRAM THEREFOR

RELATED APPLICATIONS

This application claims priority under 35 U.S.C. § 119 to Japanese Patent Application No. 2004-021467 filed Jan. 29, 2004, the entire content of which is hereby incorporated by reference.

BACKGROUND OF THE INVENTION

1. Technical Field

The present invention relates to a technique which is useful for the detection of a pulsed signal. In particular, the present invention relates to a technique for measuring a distance by utilizing a reflection of a pulsed light, and relates to a technique for detecting a faint reflected pulsed light at a high sensitivity.

2. Related Art

A technique is known for measuring a distance to an object by irradiating a pulsed light to the object and detecting a reflected light. This technique is called a "light wave distance measuring technique" and is a technique for determining the distance to an object on the basis of a time difference between an irradiation timing of the pulsed light to the object and a detection timing of the reflected light. The technique is described, for example, in patent document 1 (Japanese Patent National Publication of Translation No. 2000-506971) and patent document 2 (Japanese Patent No. 3089332).

The light wave distance measuring technique mentioned above includes a method using a reflected light from a reflector for exclusive use called a "cube corner reflector", and a method using a reflected light from an optionally selected object without using the cube corner reflector. The method using no cube corner reflector is easier to use because it uses a simple structure using no cube corner reflector; however, since the reflected light is weak, a device is necessary for detecting the pulsed light.

In the distance measuring technique, it is desired to measure at a higher accuracy and measure in a larger range (a larger measurement range). In the case of improving accuracy of measurement data, it is necessary to make a sampling interval of an output from a light receiving element shorter. However, making the sampling interval short requires an increase in sampling data. This matter appears to be significant in the case in which the measurement range is enlarged.

Since it is preferable to measure the distance in the shortest time possible, it is not preferable that the sampling data be increased. Furthermore, there is a problem in that the increase of the sampling data increases a load on a memory storing the data and an arithmetic circuit, thereby incurring a high cost and an increase in electric power consumption. The increase of the electric power consumption is significantly disadvantageous in that the light wave distance measuring apparatus is frequently used outdoors and requires a construction which can be driven by a battery. Furthermore, there is a problem in that a restriction on a circuit design is increased by increasing sampling frequency, and a high cost is incurred.

Furthermore, in the measurement using no cube corner reflector mentioned above, since an intensity of the reflected light is weak, it is necessary to devise it so as to improve detection accuracy of the reflected pulsed light. As this technique, there has been known a process for temporarily storing the sampling data of the reflected pulsed light at plural times, and accumulating the stored sampling data for a plurality of pulses (for example, for ten pulses) in a state of positioning the data on a time axis. In this process, there is executed an arithmetic process of accumulating the sampling data at the same sampling position in a plurality of pulses and improving an S/N ratio. In other words, there is executed an arithmetic process of overlapping a plurality of pulses.

However, this method requires processing time for processing the pulses at plural times, and has a problem in that measuring time is increased. Since the data amount to be processed is increased in the case of enlarging the measurement range, this tendency becomes more serious.

As mentioned above, when seeking out the measuring accuracy in spite of the restriction in the processed sampling data, it is unavoidable to make a sacrifice of the measurement range. On the other hand, in the case of seeking out the magnitude of the measurement range, it is unavoidable to widen the sampling interval, so that the measuring accuracy is sacrificed. Furthermore, in the system using no cube corner reflector, a predetermined measuring accuracy can be obtained only by further making a sacrifice of the measurement range in addition thereto, so that there is additionally a problem that the measuring time becomes long. As mentioned above, a point to be improved exists in the light wave distance measuring technique.

The patent document 1 describes a technique for executing a rough measurement utilizing one to three pulses and a precise measurement utilizing a plurality of pulses. The technique corresponds to one of the approaches for improving the problems mentioned above; however, in the case in which the reflected light is weak without using the cube corner reflector, there is a disadvantage that a sufficient detecting output cannot be obtained in the rough measurement, and the signal fails to be picked up.

SUMMARY OF THE INVENTION

An object of the present invention is to provide a light wave distance measuring apparatus which is operated with a limited memory capacity and a limited electric power consumption, has a short measuring time even for faint reflected light, can execute an accurate measurement at a relatively low sampling frequency, and has a wide measurement range. Furthermore, an object of the present invention is to provide a technique which can be utilized in the light wave distance measuring apparatus.

In accordance with the present invention, there is provided a processing apparatus of a pulsed signal including: a sampling portion for sampling one pulsed signal or a response signal in correspondence to the signal at a predetermined timing; an adding portion for combining a plurality of the sampled sampling data in accordance with a predetermined relationship; and a memory portion for storing the combined data in a predetermined address, wherein the data stored in the memory portion is constituted by a data enhancing a level of the pulsed signal.

A description will be given first of a basic principle of the present invention. In accordance with the present invention, in order to improve a detection accuracy of a pulsed signal, a step executes a combination of the sampling data of one pulsed signal or the response signal responding to one pulsed signal, thereby obtaining a signal having an improved detection intensity. In this case, the combination means adding the sampling data in one pulse.

A description will be given in detail given below of the combination of the sampling data. First, the sampling has two methods. One of the methods corresponds to a case of sampling the pulsed signal as it is. The other method corresponds to a case of converting the pulsed signal into a proper signal wave form suitable for processing, and applying the sampling to the converted signal.

A description will be given first of the first sampling method. When sampling the signal of one pulse at a predetermined sampling interval, a plurality of sampling data is obtained. Furthermore, a higher level of signal can be obtained by adding a plurality of sampling data to each other. Accordingly, it is possible to detect the fainter pulsed signal at a higher S/N ratio. A description will be given below of a principle of the first method by giving one example.

FIG. 1 is a graph explaining one example for sampling a pulsed signal by utilizing the present invention. FIG. 1A shows a state of sampling one pulsed signal 201 at a sampling interval Ts. FIG. 1B shows a pulsed wave form 201 and a combined wave form 202 in which the S/N ratio is increased by a combining process of the sampling data on the basis of the pulsed wave form 201. In this case, a vertical axis in FIG. 1 shows an relative value showing a level of the signal, and a horizontal axis shows a time axis.

FIG. 1A shows an example in which a sampling data is obtained at sampling points shown by reference numerals 1 to 15 by sampling the pulsed wave form 201 at the sampling interval Ts (that is, a sampling frequency (1/Ts)). In this case, the step combines by adding the sampling data at the adjacent sampling points such as the sampling points 1 and 2, 3 and 4, 5 and 6, . . . . Then, as shown in FIG. 1B, the combined wave form 202 in correspondence to the pulsed wave form 201 can be obtained.

The combined wave form 202 is formed as a wave form in which the S/N ratio is improved in comparison with the basic pulsed wave form 201. Since a noise level is a random fluctuation in which a phase and an amplitude are fixed, a partially denied component exists at a time of combining, and a value is not increased in the same manner as the combined value of the sampling data. Accordingly, the noise level is reduced equivalently with respect to the signal level. Therefore, the S/N ratio of the combined wave form 202 is improved in comparison with the pulsed wave form 201. It is possible to improve the S/N ratio of the pulsed signal by combining the data obtained by sampling the wave form of one pulse at a predetermined interval. Furthermore, in accordance with the method, the number of pieces of data to be processed can be reduced.

In this method, it is preferable that the combined sampling data be acquired from the nearby sampling position. The pulsed signal suddenly increases in level and suddenly decreases. Accordingly, the level can be more effectively enhanced by adding the sampling data at the nearby sampling positions. For example, in the example shown in FIG. 1B, it is possible to obtain a signal value having a higher level by combining the sampling data at the sampling position 7 and the sampling position 8 which are adjacent to each other, in comparison to combining the sampling data at the sampling position 1 and the sampling position 7.

Next, a description will be given of a method of converting the pulsed signal into a proper signal more suitable for the process and applying the sampling to the converted signal. As one example of a proper signal wave form suitable for the process, a damped oscillation wave form way be mentioned. The damped oscillation wave form means an oscillation wave form in which an amplitude is gradually damped at a fixed or an approximately fixed cycle. The damped oscillation wave form can be obtained by making the pulsed signal pass through an amplifier provided with a tuning circuit (a tuning amplifier). As described in below, when executing the combination of the sampling data by utilizing periodicity of a damped oscillation wave form 206, it is possible to detect the pulsed signal at a high sensitivity even if the basic pulsed signal is weak.

FIG. 2 is a graph showing a wave form of the pulsed signal and a damped oscillation wave form responding to the pulsed signal. As shown in FIG. 2, when making a pulsed wave form 205 shown in FIG. 2A to pass through the tuning amplifier, the damped oscillation wave form 206 shown in FIG. 2B is obtained. The vertical axis in FIG. 2 shows a relative value showing a level of the signal, and the horizontal axis shows time. The tuning amplifier means an amplifier provided with the tuning circuit in a signal path of an amplifying circuit.

The damped oscillation wave form means a wave form in which the cycle is approximately fixed and the amplitude is gradually damped, as shown by reference numeral 206 in FIG. 2. As shown in FIG. 2, in the damped oscillation wave form 206, the amplitude is damped together as time elapses; however, a peak portion 207, a trough portion 208, a peak portion 209, and a trough portion 210 alternately periodically appear.

Accordingly, there is executed a process of overlapping the peak portion and the peak portion of the damped oscillation wave form, or the trough portion and the trough portion, by utilizing the periodicity. The oscillation wave form in which the peak portion and the trough portion are enhanced can be obtained by executing this. For example, the step accumulates an amplitude value of the peak portion 207 of the damped oscillation wave form 206 and an amplitude value of the next peak portion 209 and further accumulates an amplitude value of the trough portion 208 and an amplitude value of the next trough portion 210. A combined wave form in which the amplitude of the damped oscillation wave form 206 is enhanced can be obtained by executing this.

Furthermore, the combined wave form in which a peak value is enhanced may be obtained, for example by executing a process of summing an area of the peak portion 207 and an area of the peak portion 209, and further executing a process of summing an area of the trough portion 208 and an area of the trough portion 210.

A peak of the amplitude value of the combined wave form to which the process mentioned above is applied becomes larger than a peak of the amplitude value of the damped oscillation wave form 206, and the S/N ratio can be improved. This becomes effective in the case in which the damped oscillation wave form is constituted by a weak signal which is going to be buried in a noise.

As mentioned above, in the processing apparatus of the pulsed signal in accordance with the present invention, it is preferable to utilize the damped oscillation wave form as the signal responding to the pulsed signal and execute the combination of the sampling data by utilizing the periodicity of the damped oscillation wave form.

As a process of overlapping the peak portion and the peak portion of the damped oscillation wave form or the trough portion and the trough portion, there may be mentioned a method of accumulating the sampling data of the peak portion 207 and the sampling data of the peak portion 209 by shifting them by one cycle (2π radian) at the sampling position. In this case, the amplitude values of top portions of the peak portions (or portions close thereto) are added and the amplitude value of bottom portions of the trough portions (or portions close thereto) are added, whereby it is possible to further improve an enhancing effect of the amplitude.

Furthermore, as another method, the step may add the amplitude value of a portion corresponding to the peak of the damped oscillation wave form and an absolute value of the amplitude value of a portion corresponding to the trough. In this case, the amplitude level is enhanced. For example, the step accumulates the amplitude value of the peak portion 207 of the damped oscillation wave form 206 and the absolute value of the amplitude value of the trough portion 208. In this case, on the assumption that the sampling value at the sampling point which is separated at a phase difference $\pi$ radian is an object to be accumulated, it is possible to increase the effect of enhancing the peak value. Furthermore, for example, the step may summing an area of the peak portion 207 of the damped oscillation wave form 206 and an area of the trough portion 208. It is possible to increase the S/N ratio of the detected signal by executing this.

Furthermore, it is preferable that one cycle or a half cycle of the damped oscillation wave form be in a relationship which is approximately integral multiple of the sampling interval. In accordance with this structure, in the case of combining the adjacent sampling data, the sampling data of a plus side wave form and the sampling data of a minus side wave form are combined, whereby it is possible to exclude a possibility of the arithmetic process in which the amplitude value is weakened. Furthermore, it is possible to effectively obtain the enhancing effect of the peak value.

The processing apparatus of the pulsed signal in accordance with the present invention is particularly preferable for the distance measuring technique using the pulsed light; however, the method can be widely applied to detection of faint pulsed light. In other words, a physical phenomenon causing the pulsed signal generation is not limited to the light receiving of the pulsed light, but may be constituted by detection of a sound wave, detection of an impact or the like.

In the processing apparatus of the pulsed signal in accordance with the present invention, it is preferable that the pulsed signal be constituted by an output signal from a light receiving element receiving the pulsed light, that the pulsed light be constituted by a reflected light of an irradiated pulsed light irradiated to a predetermined object, and that the apparatus be further provided with a light generating portion of the pulsed light, and a distance calculating portion for calculating a distance from the light receiving element to the object by utilizing the combined data and the irradiation timing of the irradiated pulsed light.

In accordance with this aspect, it is possible to obtain a preferable structure for the distance measuring apparatus using a laser beam. In other words, there is provided a distance measuring apparatus which irradiates the pulsed laser light to the object from the light generating portion, receives the reflected light by the light receiving element, utilizes the pulsed signal output from the light receiving element, executes a process of the sampling data for improving the S/N of the detected signal mentioned above, and calculates the distance to the object by utilizing the process result. Since the apparatus can increase the detected S/N ratio of the pulsed signal, it is possible to execute the detection of the pulsed light at a high sensitivity. Accordingly, even in the case in which the reflector for exclusive use called a "cube corner reflector" is not used, it is possible to detect the weak reflected light at a high sensitivity.

Furthermore, since the information included in one pulse is utilized, it is possible to shorten the processing time in comparison with the method using a plurality of pulses as in the prior art. Furthermore, since the added data is stored in the memory in the processing circuit, it is possible to save the memory capacity. Accordingly, it is possible to employ a circuit which has low electric power consumption and has a simpler and lower-cost structure.

Furthermore, in the case in which the damped oscillation wave form is used as the signal of the processing object, since the signal wave form is expanded on the time axis and the sampling is executed therefrom, it is possible to lower the sampling frequency. This holds down the load applied to the circuit, and is effective for the low electric power consumption and the low cost.

Furthermore, in the case of utilizing the damped oscillation wave form, it is possible to accumulate the expanded signals on the time axis, compress it on the time axis, and increase the peak value of the signal. Accordingly, it is possible to increase the S/N ratio of the signal and it is possible to increase the detection sensitivity even for a weak signal.

In the distance measuring apparatus mentioned above, it is preferable that the apparatus be provided with a switch portion for changing a mode between a rough measurement mode for executing a measurement of a distance in a first distance measurement range by a sampling in accordance with a principle shown in FIG. 1 or 2, and a precise measurement mode for executing a sampling in a second distance measurement range narrower than the first distance measurement range.

In accordance with this aspect, in the rough measurement mode, it is possible to determine the distance to the object by utilizing the processing method of the sampling data shown in FIGS. 1 and 2, and in the precise measurement mode, it is possible to execute a measurement see to obtain an accuracy in the narrower distance range.

Furthermore, in the precise measurement mode, it is preferable to execute the sampling of a plurality of pulsed lights, and to accumulate the sampling data. Furthermore, in the aspect mentioned above, it is preferable that the sampling frequency in the precise measurement mode be higher than the sampling frequency in the rough measurement mode.

In this case, accumulation means accumulating the sampling data in the different pulses. In this case, in the present specification, the case of accumulating the sampling data in one pulse is expressed as a combination.

In the case of employing the method of accumulating the sampling data with respect to a plurality of pulses as the precise measurement mode, it is possible to accurately detect the pulsed wave form by using the sampling data with respect to a plurality of pulses. Accordingly, it is possible to execute the measurement of the distance at a higher accuracy.

Furthermore, in the case of employing the method of increasing the sampling frequency as the precise measurement mode, since the sampling data can be obtained in a narrower interval, it is possible to improve the accuracy of the measurement. In this case, in the precise measurement mode, the accumulation of the sampling data and the employment of the high sampling frequency may be combined.

In the aspect employing both the rough measurement mode and the precise measurement mode mentioned above, it is preferable that the switch portion switch the mode from the rough measurement mode to the precise measurement mode, in the case in which the second distance measurement range is determined by the rough measurement mode. Of course, the switch of the measurement mode may be manually operated.

In accordance with the aspect, it is possible to execute the measurement of the precise distance in which the measurement range is decreased, after a certain level of rough distance is measured by the rough measurement mode which can measure in a short time. In this case, since the range to be measured is narrowed, the data amount is not expanded and the processing time is not increased even if one or both the precise measurement using a plurality of pulsed lights and the measurement having the higher sampling frequency is executed in the precise measurement mode. Accordingly, it is possible to improve the measuring accuracy without increasing the processing time and increasing the load applied to the circuit.

As explained by referring to FIG. 1 or FIG. 2, since the rough measurement mode can detect the signal of one pulse at a high accuracy even in the case of faint reflected pulsed light, the rough measurement mode is suitable for obtaining a rough distance in a short measuring time.

In particular, in the case of utilizing the damped oscillation wave form, the signal wave form is expanded on the time axis, a large number sampling points are obtained, and the improvement of the S/N ratio of the detected signal is executed in accordance with the combining process of the sampling data. Accordingly, it is possible to improve the detection sensibility of the single pulse reflected from the object, in spite of having not made the sampling very detailed. This is extremely useful in a light wave distance meter in which a large measurement range is required.

On the other hand, since the method of combining the sampling data in accordance with the present invention combines the sampling data in one pulse or the wave form responding to one pulse, the strictness of the definite position of the sampling point on the time axis is sacrificed.

In accordance with the circumstances mentioned above, the method exemplified in FIGS. 1 and 2 has advantages such as the measurement in a short time, a low electric power consumption, use of less memory capacity, and reduced load applied to the circuit without requiring a large sampling frequency; however, there is a sacrifice of the measurement of the precise distance.

On the other hand, in the method of sampling the pulsed wave form or the damped oscillation wave form on the basis of the pulsed wave form over plural pulses, adding the sampling data for plural pulses, and improving the S/N ratio, or the method of executing the sampling by increasing the sampling frequency, the precision of the measurement can be sought in contrast to the rough measurement mode while the other matters are sacrificed.

In other words, in the precise measurement mode, it is possible to precisely determine the peak of the pulsed signal and the center of gravity (the center of gravity on the time axis), so that the precise measurement mode has an advantage in a point of the measurement of the precise distance; however, it sacrifices the measurement for a short time, the low electric power consumption, the use of the less memory capacity, and the low load applied to the circuit.

Accordingly, it is possible to obtain a light wave distance measuring apparatus provided with the advantages of both the modes, by combining both the modes. In other words, the rough distance measurement is executed for a short time in accordance with the rough measurement, and the precise distance measurement is executed in accordance with the precise measurement after narrowing the range. In this case, since the precise measurement is executed only in an extremely narrow distance range, it is possible to reduce the problem such as the increase of the processing time, the increase of the load applied to the circuit and the increase of the electric power consumption which causes the problem in the precise distance measurement from being generated.

As mentioned above, it is possible to obtain the light wave distance measuring apparatus provided with the advantages such as the precise measurement executed while having the wide measurement range, the measurement for a short time, the low electric power consumption, the use of the less memory capacity and the small load applied to the circuit.

The pulsed light processing apparatus in accordance with the present invention can be understood as a processing method of a pulsed signal, or a program for executing a process of a pulsed signal. In other words, in accordance with the present invention, there is provided a processing method for a pulsed signal, including:

In accordance with the present invention, there is provided a processing method of a pulsed signal including: a sampling step of sampling one pulsed signal or a response signal in correspondence to the pulsed signal at a predetermined timing; an adding step of combining a plurality of the sampled sampling data; and a memory step of storing the combined data in a predetermined address.

Furthermore, in accordance with the present invention, there is provided a program for executing a processing method of a pulsed signal, the program being capable of being executed by a computer, wherein the computer executes a sampling procedure of sampling one pulse signal or a response signal in correspondence to the pulsed signal at a predetermined timing; an adding procedure of combining a plurality of the sampled sampling data; and a memory procedure of storing the combined data in a predetermined address.

The lower limiting matters relating to the processing apparatus of the pulsed signal as mentioned above can be understood as the steps for executing each of the limiting contents and the contents further limiting the invention of the processing method of the pulsed signal. Furthermore, the lower limiting matters relating to the processing apparatus of the pulsed signal mentioned above can be understood as the procedure for executing each of the limiting contents, and the contents for further limiting the program for executing the processing method of the pulsed signal.

In accordance with the present invention, it is possible to make the peak value of the pulsed signal large by adding the sampling data of the pulsed signal for one pulse, whereby it is possible to improve the S/N at a time of detecting the pulsed signal. Furthermore, it is possible to expand the signal wave form on the time axis by executing the sampling utilizing the periodicity of the damped oscillation wave form responding to the pulsed signal, and it is possible to effectively execute the process of enhancing the peak value in spite of the low sampling frequency. In other words, in accordance with the present invention, since the signal wave form of the single pulse is expanded on the time axis, it is possible to execute the measurement without failing to pick up the pulsed signal even in the low sampling frequency.

In the case in which the present invention is applied to the measuring technique of the distance, since the high sampling frequency is not required, and the processing time can be shortened, the measuring time is not increased even by increasing the range of the distance measurement. Accordingly, there can be provided a light wave distance measuring apparatus which is operated with limited memory capacity and electric power consumption, has a short measuring time even in the case of the faint reflected light, executes the measurement at a relatively lower sampling frequency, and has a wide measurement range. Furthermore, there can be provided a light wave distance measuring technique having the advantages mentioned above.

Furthermore, the wide measurement range and the precise measurement can be both established by setting the method of sampling one pulse signal or the response signal responding to one pulse signal at the predetermined timing to the rough measurement mode, setting the method using the sampling data of a plurality of pulsed lights or the method of increasing the sampling frequency to the precise measurement mode, and combining both the modes.

The present invention can be applied to the technique of executing the detection of the pulsed signal at a high sensitivity. In particular, the present invention can be utilized in a light wave distance measuring apparatus which has a wide measurement range, has a fast measuring process, can measure at high precision, is operated at low electric power consumption, and is provided at a low cost, using a distance measuring technique using pulsed laser light.

DETAILED DESCRIPTION OF THE DRAWINGS AND THE PRESENTLY PREFERRED EMBODIMENTS

1. First Embodiment 1-1 Structure of Embodiment

Figure 3:
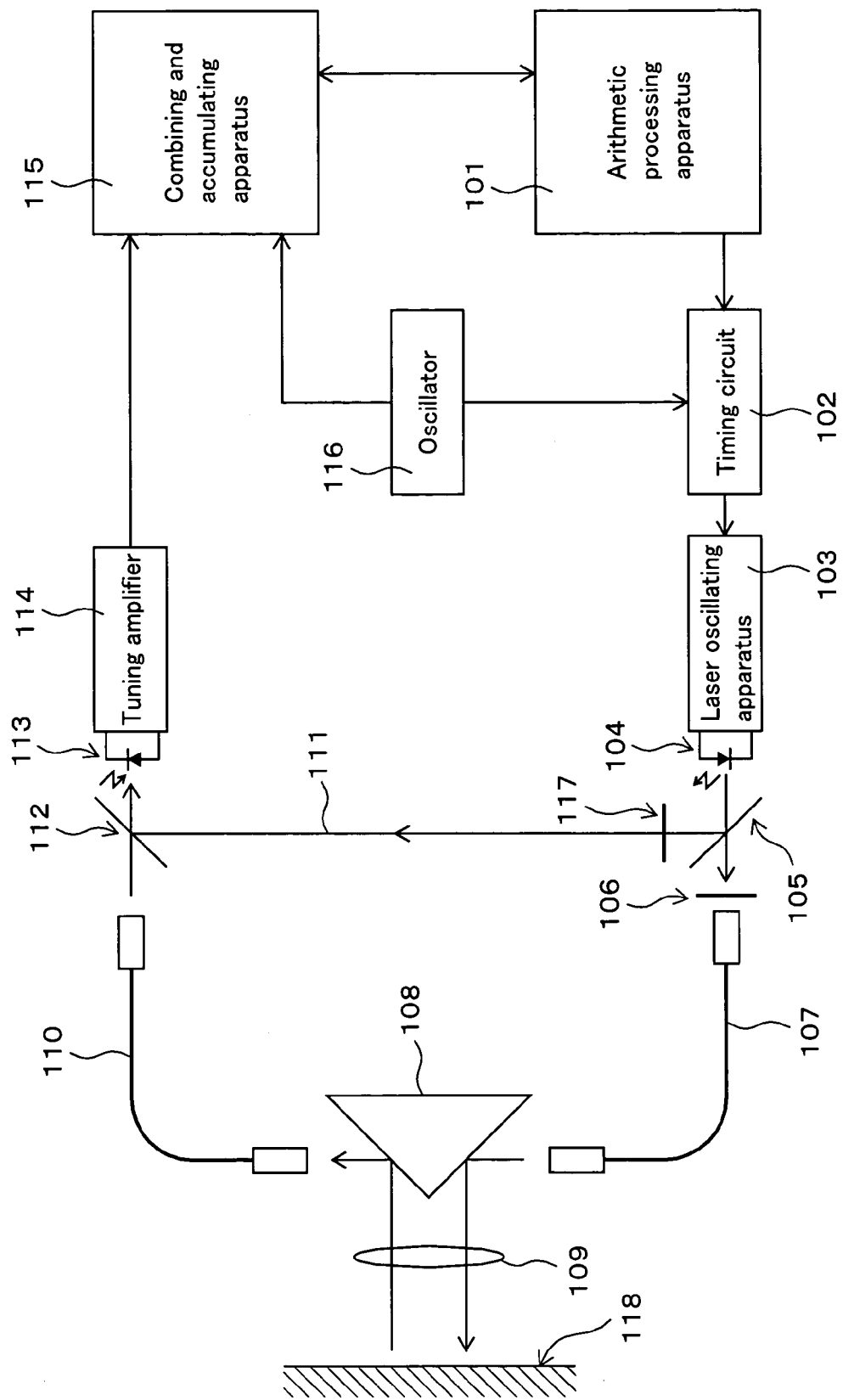
FIG. 3 is a block diagram showing an example of a light wave distance measuring apparatus utilizing the present invention.
Figure 4:
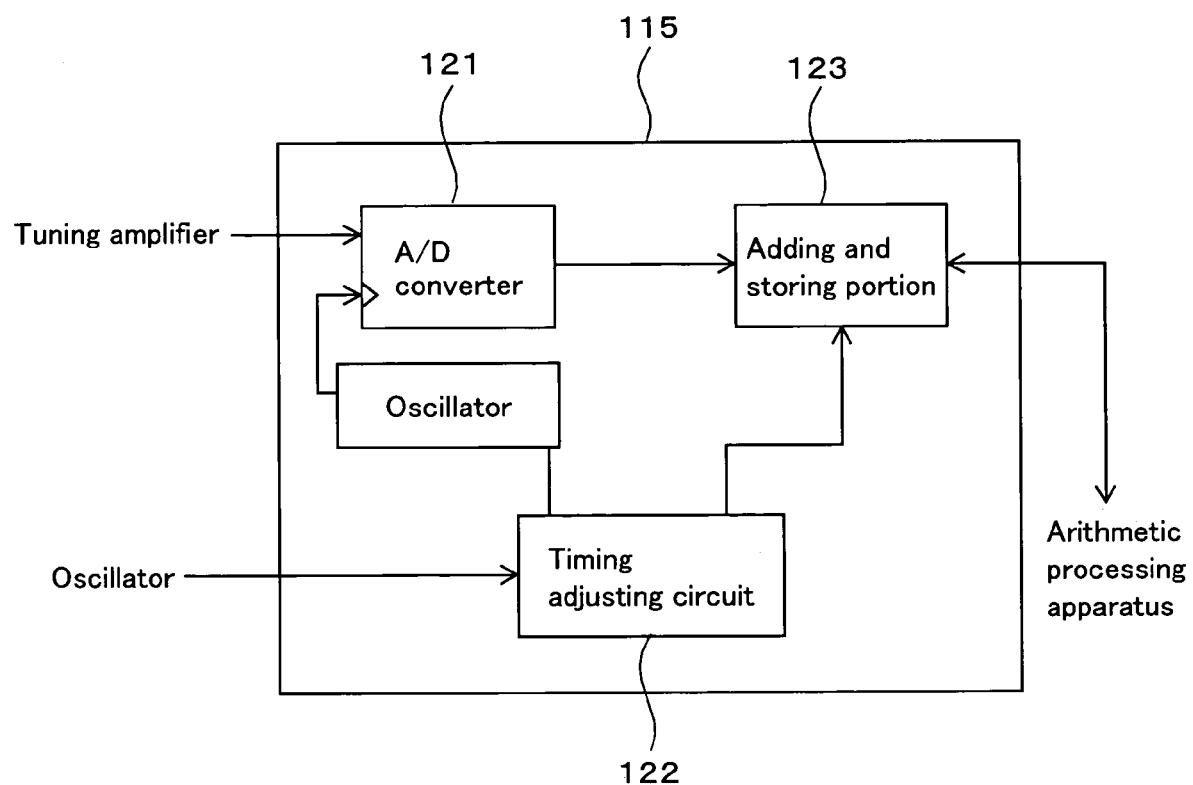
FIG. 4 is a block diagram showing an example of a combining and accumulating apparatus.

FIG. 3 is a block diagram showing an example of a light wave distance measuring apparatus utilizing the present invention. FIG. 4 is a block diagram showing an example of a combining and accumulating apparatus in the light wave distance measuring apparatus. The light wave distance measuring apparatus shown in FIG. 3 is provided with an arithmetic processing apparatus 101, a timing circuit 102, a laser oscillating apparatus 103, a light emitting element 104, a half mirror 105, a light shutter 106, a light emitting side optical fiber 107, a mirror 108, an object lens 109, a light receiving side optical fiber 110, an inside reference light path 111, a half mirror 112, a light receiving element 113, a tuning amplifier 114, a combining and accumulating apparatus 115, an oscillator 116 and a light shutter 117.

The arithmetic processing apparatus 101 has a function of executing a procedure for executing a measurement of a distance mentioned below, a memory storing the procedure, an arithmetic function of executing a calculation of the distance, and a switch function of switching a measurement mode.

The timing circuit 102 supplies a timing signal for oscillating the laser light to the laser oscillating circuit 103 at a timing on the basis of a reference signal generated by the oscillator 116, in accordance with a command from the arithmetic processing apparatus 101. The laser oscillating apparatus 103 generates a signal for driving the light emitting element 104 on the basis of a timing signal output from the timing circuit 102. The light emitting element 104 is a pulsed laser diode, is driven by the laser oscillating apparatus 103 and emits the laser pulsed light at a predetermined timing.

The half mirror 105 makes a part of the pulsed light emitted from the light emitting element 104 to transmit it as it is, and reflects the other part in a direction which is 90 degrees to the direction of incidence. For example, the half mirror makes 90% in a light amount ratio of the pulsed light incident from the light emitting element 104 to be transmitted as it is, and reflects the remaining 10% thereof in a direction of the inside reference light path 111. The light shutter 106 selects whether or not to introduce the pulsed light from the light emitting element 104 to the light emitting side optical fiber 107. Furthermore, the light shutter 117 selects whether or not to introduce the pulsed light from the light emitting element 104 to the inside reference light path 111.

The light emitting side optical fiber 107 introduces the pulsed light from the light emitting element 104 to the mirror 108. The pulsed light from the light emitting side optical fiber 107 is reflected by the mirror 108, and is emitted to an object to be irradiated 118 via the object lens 109.

The reflection pulsed light reflected by the irradiated object 118 reaches the mirror 108 through the object lens 109, and is further reflected there so as to reach the half mirror 112 while being introduced by the light receiving side optical fiber 110. The half mirror 112 makes the pulsed light from the light receiving side optical fiber 110 to transmit, and reflects the pulsed light from the inside reference light path 111 in the direction of the light receiving element 113 on the other hand.

The light receiving element 113 is constituted by a photoelectric conversion element. As the light receiving element 113, there can be employed, for example, an avalanche photodiode capable of detecting the light at a high sensitivity. The light receiving element 113 converts the incident pulsed light into an electric signal. The tuning amplifier 114 is provided with an amplifier circuit (an amplifier) and a tuning circuit, and outputs a damped oscillation wave form signal responding to the pulsed light output from the light receiving element 113.

Figure 2:
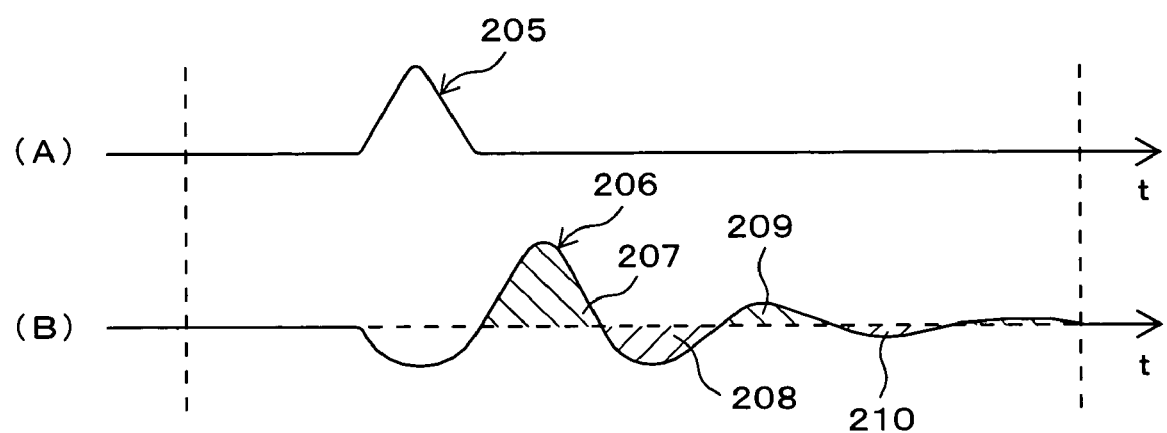
FIG. 2 is a graph explaining a relationship between the pulsed signal and a damped oscillation wave form.

Since the output signal from the light receiving element 113 is structured such as to respond to the received pulsed light, the wave form is of course constituted by a pulse-like wave form. When passing the pulse-like wave form through the tuning amplifier, there can be obtained a damped oscillation wave form in which an amplitude is damped at a predetermined cycle. The damped oscillation wave form corresponds to a wave form in which an alternately positively and negatively oscillating amplitude gradually decreases on the time axis (for example, refer to FIG. 2).

The combining and accumulating apparatus 115 is provided, for example, with a structure of a block diagram shown in FIG. 4. The combining and accumulating apparatus 115 has a function of sampling the damped oscillation wave form output from the turning amplifier 114, and combing or accumulating the sampling data, and a function of storing the combined or accumulated data.

The combining and accumulating apparatus 115 shown in FIG. 4 is, provided with an A/D converter 121, an adding and storing portion 123, and a timing adjusting circuit 122. The A/D converter 121 samples the damped oscillation wave form output from the tuning amplifier 114 on the basis of a timing signal from the timing adjusting circuit 122. The adding and storing portion 123 has a function of adding the sampling data sampled by the A/D converter 121 on the basis of the timing signal sent from the timing adjusting circuit 122 in accordance with a procedure mentioned below, and further storing the added data in a predetermined address. The adding and storing portion 123 is provided with an adding circuit for executing the adding process and the storing, a memory circuit (a memory), and a counter for counting a sampling clock.

1-2. Action of Embodiment

In this case, a description will be given of an example of a processing procedure combining the rough measurement mode for measuring the rough distance, and the precise measurement mode for measuring the precise distance by executing the sampling in the narrow distance range on the basis of the rough distance measured in accordance with the rough measurement mode. Furthermore, in this case, a description will be given of an example of the rough measurement mode, in which the faint reflected pulsed light is detected at a high sensitivity by using the reflected pulsed light of two pulses.

(Motion of Rough Measurement Mode)

Figure 5:
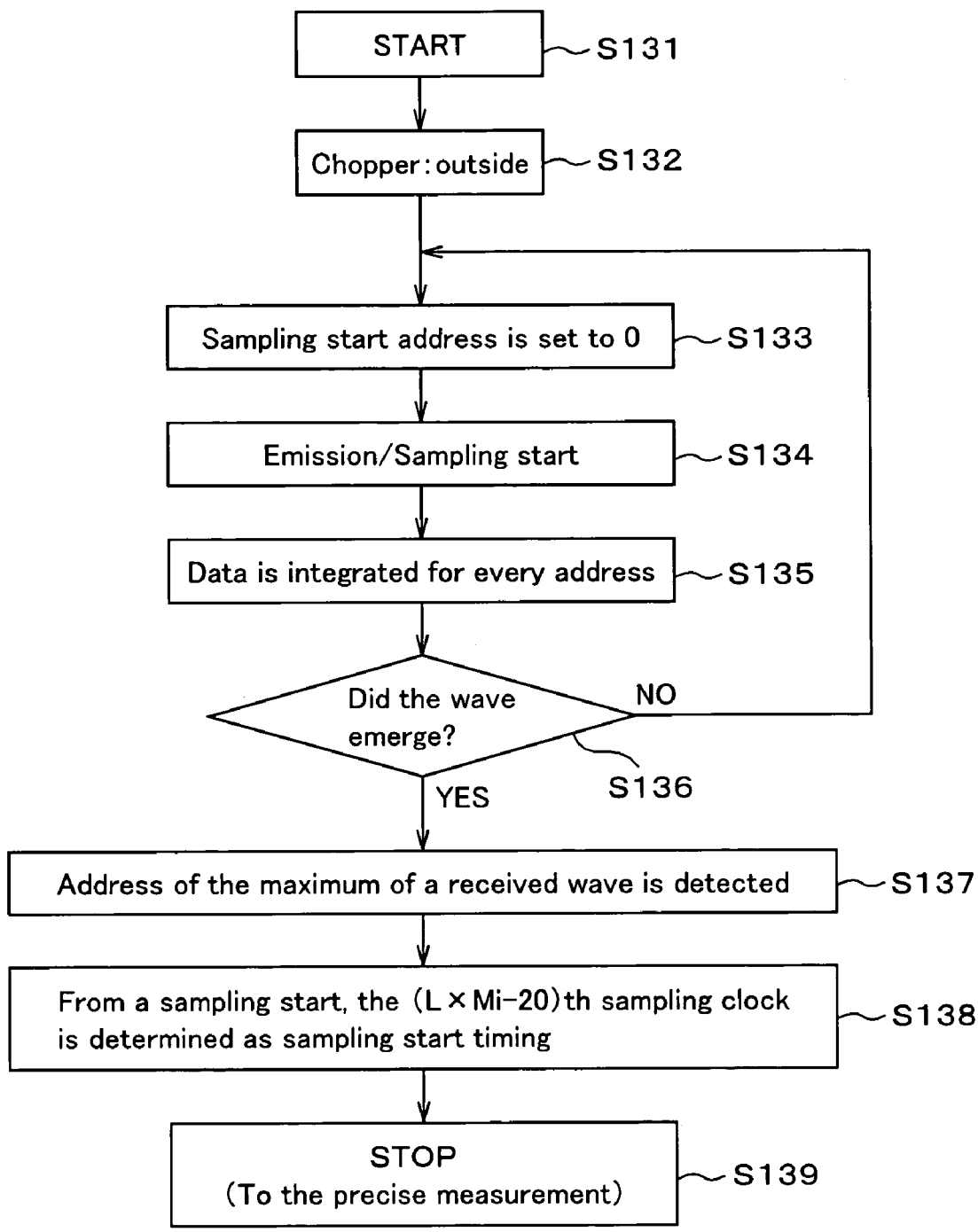
FIG. 5 is a flow chart showing one example of a procedure of a light wave distance measurement.

First, a description will be given of an example of the rough measurement mode. FIG. 5 is a flow chart showing a processing procedure of the rough measurement mode in accordance with the present embodiment. The process is started from a state in which the light shutters 106 and 117 are closed (a non-passing state) (a step S131). When the process is started, the optical shutter 106 is first released, a state "chopper: outside" is set (a step S132), and a sampling address is next set to 0 (a step S133). Next, the laser oscillating apparatus 103 is operated in accordance with the timing signal from the timing circuit 102, the laser light is pulsed emitted from the light emitting element 104, and the sampling is started (a step S134).

In other words, the emitted pulsed light is brought into contact with the target object 118 via the mirror 108 and the object lens 109, and is reflected there so as to travel along a reverse path. The light receiving element 113 receives the reflected pulsed light, and outputs an electric signal responding to the received pulsed light in accordance with the photoelectric conversion effect. The output signal from the light receiving element 113 is constituted by a pulsed signal in correspondence to the pulsed light. The tuning amplifier 114 amplifies the pulsed signal and outputs the damped oscillation wave form as shown by reference numeral 206 in FIG. 2.

In the step S134, the sampling process is applied to the damped oscillation wave form from the tuning amplifier 114. Furthermore, in a step S135, accumulation (addition) of the sampling data is executed with respect to one pulse, and the data combined in accordance with the sampling clock is stored. The process of the sampling data is executed by the combining and accumulating apparatus 115. In this case, details of the process contents will be described later.

The amplitude of the output wave form of the tuning amplifier is enhanced and the S/N ratio is improved as mentioned below, by executing accumulation of the sampling data, in the step S135. Accordingly, it is possible to make the wave form which is going to be buried in the noise level emerge. After the process in the step S135, the step judges whether or not the wave form of the level capable of being utilized for the distance calculating process in the arithmetic processing apparatus 101 emerges (a step S136). If the wave form emerges (that is, the S/N ratio equal to or more than a predetermined level is obtained), the step goes to a step S137, and if not, the step goes back to a previous stage of the step S133, and again executes the process of the step S133 and under.

In the step S137, the step searches for a wave form having a maximum value (a peak value) in the wave form reproduced from the data stored in the memory of the combining and accumulating apparatus 115, and detects an address Mi thereof (the step S137). Since the address Mi corresponds to an address number in correspondence to a lock number from a sampling start (that is, the light emitting timing), it is possible to calculate a flight time of the pulsed light on the basis of the address.

Next, a clock scale division is determined to the sampling start timing in the precise measurement mode by a sampling clock (L×Mi−20: L is a frequency of combination) from the sampling start (a step S138). The value of Mi includes information relating to the rough distance to the object reflecting the laser pulsed light. In order to utilize the numerical value, the combination frequency L is multiplied so as to be easily utilized in the later calculation, and in order to keep on the safe side of the precise measurement range, the time point subtracting twenty clocks is set to the sampling start timing.

In other words, the information relating to the rough distance to the object is obtained in the step S137, and the range in which the sampling is executed in the next precise measurement mode is designated in the step S138. The process in the rough measurement mode is finished in the manner mentioned above, and the mode is changed to the precise measurement mode (a step S139). The measurement of the rough distance range in accordance with the rough measurement mode is executed as mentioned above, and the narrower range is designated for executing the next precise measurement mode.

(Processing of Data in Rough Measurement Mode)

Figure 6A:
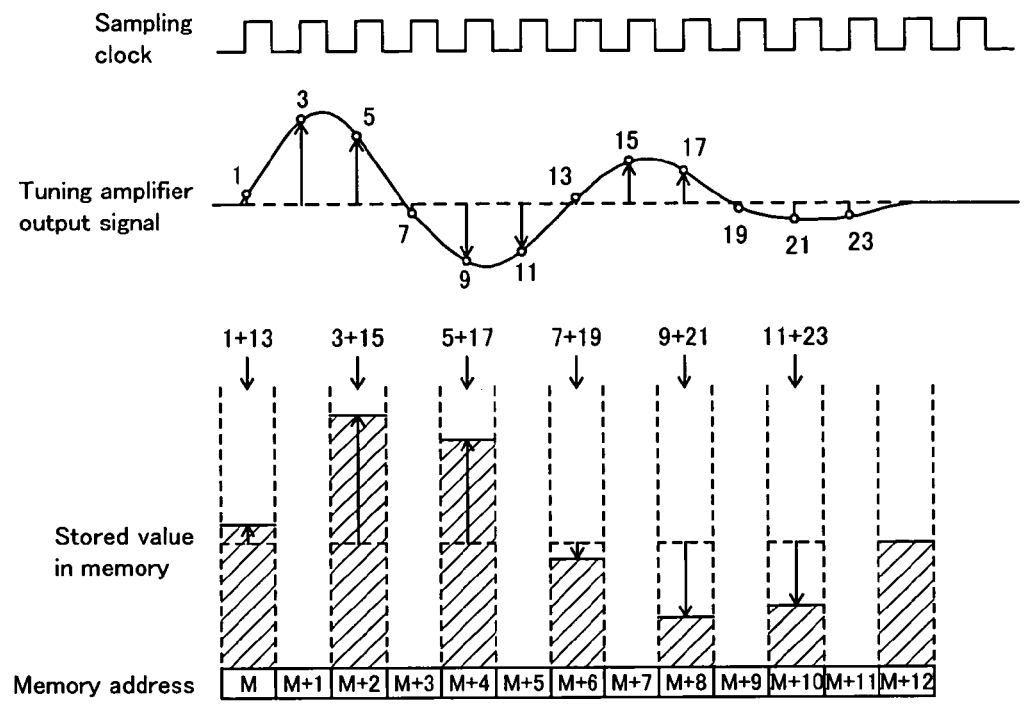
FIG. 6 is a conceptual diagram explaining a combining method of sampling data.
Figure 6B:
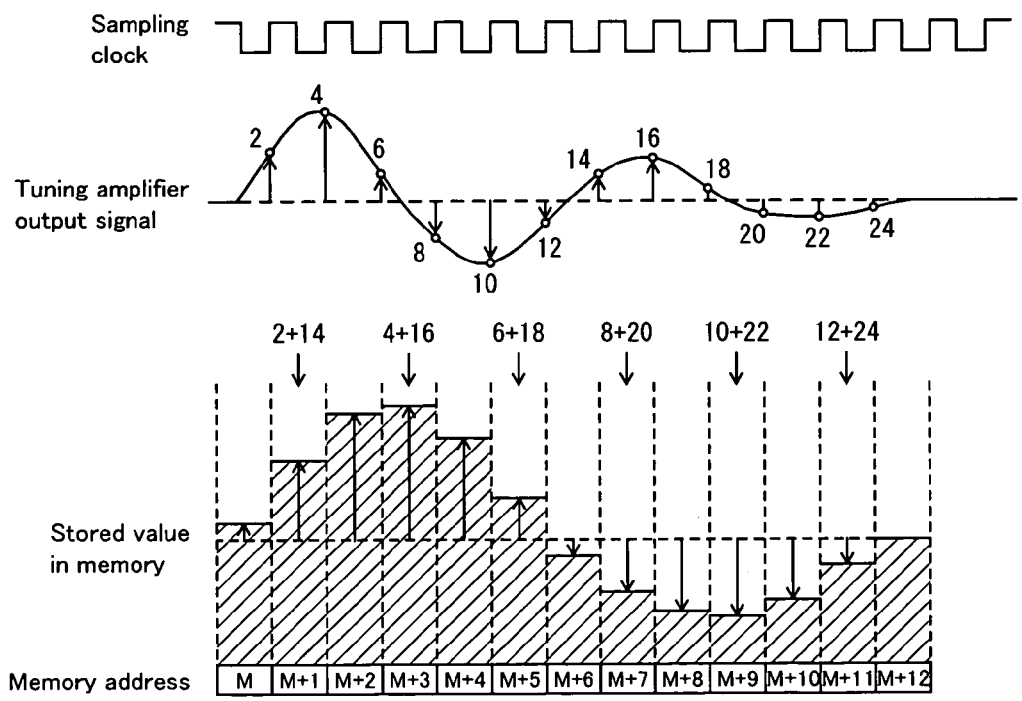

A description will be in detail given below of contents of the process in the step S134 and the step S135 in FIG. 5 on the basis of one example. In this aspect, the sampling process and the accumulating process of the sampling data are applied to two pulses. FIG. 6 is a conceptual diagram for explaining the sampling method in the rough measurement mode in accordance with the present embodiment, and shows an example of L=2. FIG. 6A shows a process timing of a first light emission (a first pulse), and FIG. 6B shows a process timing of a second light emission (a second pulse).

A description will be given first of the sampling process. The sampling process is executed on the basis of a sampling clock generated in the timing adjusting circuit 122 (refer to FIG. 4) on the basis of the reference signal from the oscillator 116 (refer to FIG. 3).

An address number synchronized with the sampling clock is applied within the memory of the adding and memory portion 123 (refer to FIG. 4). In this case, a numeric value is sequentially applied by setting the measurement start point to 0. Reference symbol M means an address number in correspondence to an Mth clock.

In the present embodiment, as shown in FIG. 6, the sampling is applied to the damped oscillation wave form (the output signal of the tuning amplifier 114). First, as shown in FIG. 6A, the sampling process is applied to the damped oscillation wave form responding to the reflection pulsed light of the first light emission. In this case, the sampling using the A/D converter 121 (refer to FIG. 4) is executed at odd numbered sampling points such as a sampling point 1, a sampling point 3, a sampling point 5, . . . , a sampling point 23, at an incrementing time of the sampling clock.

The sampled signal is stored in the memory within the adding and memory portion 123. At this time, the process is executed such as adding the sampling data in the sampling point 1 and the sampling point 13, storing the data in the memory address M in the memory, adding the sampling data in the sampling point 3 and the sampling point 15, storing the data in the memory address M+2 in the memory, adding the sampling data in the sampling point 5 and the sampling point 17, and storing the data in the memory address M+4 in the memory. In other words, the odd number of sampling data in a point which is one cycle shifted in the damped oscillation wave form is added, and the value is stored in the memory address alternately.

The process applied to the pulse at the second light emission is executed. In other words, as shown in FIG. 6B, the sampling process is applied to the damped oscillation wave form responding to the reflection pulsed light of the second light emission. In this case, the sampling clock employs a clock obtained by one half cycle shifted from the sampling clock used in the sampling of the reflection pulsed light at the first light emission shown in FIG. 6A.

In this case, the sampling using the A/D converter 121 (refer to FIG. 4) is executed at even numbered sampling points such as a sampling point 2, a sampling point 4, a sampling point 6, ..., a sampling point 24, at an incrementing time of the sampling clock.

In this case, the process is executed such as adding the sampling data in the sampling point 2 and the sampling point 14, storing the data in the memory address M+1 in the memory, adding the sampling data in the sampling point 4 and the sampling point 16, and storing the data in the memory address M+3 in the memory. In other words, the sampling data at the even timings at a point which is one cycle shifted in the damped oscillation wave form is added, and the value is stored in the remaining alternate memory address.

On the basis of the periodicity of the damped oscillation wave form, the amplitude in the point shifted at one cycle has the same positive and negative direction. Accordingly, in this process, the amplitude data for two cycles is compressed to one cycle by adding the amplitude in the point shifted at one cycle, and the amplitude is alternatively elongated. Accordingly, as is understood by seeing the wave form obtained from the data stored in the memory addresses M to M+12 in FIG. 6B, the amplitude (the peak value) of the damped oscillation wave form output from the tuning amplifier 114 is largely elongated and enhanced.

As is apparent from the principle that the S/N ratio is improved by the overlap of the signals, an increase of the noise level generated by the overlap of the noise components having random phases does not coincide with an increase of the signal level generated by the overlap of the signals having the aligned phases, and a rate of increase of the latter signal level is larger. Accordingly, the S/N ratio of the output signal of the tuning amplifier is improved by the process mentioned above.

The process shown in FIG. 6 corresponds to a process of combining peaks which are shifted at one cycle in the damped oscillation wave form, and troughs which are shifted at one cycle, and enhancing the amplitude of the signal. Furthermore, it also corresponds to a process of combining the amplitudes in the positive side of the signal wave forms oscillating periodically while damping, combining the amplitudes in the negative side, and enhancing the amplitude.

In the process shown in FIG. 6, the damped oscillation wave form is set so as to form an approximately integral multiple relationship with sampling interval. In other words, the frequency (the sampling frequency) of the sampling clock is determined such that the integral multiple of the sampling interval coincides or approximately coincides with the cycle (or the half cycle) of the damped oscillation wave form. Since the cycle of the damped oscillation wave form is determined on the basis of the tuning frequency of the tuning amplifier, the relationship between the pulse width of the pulsed light and the sampling frequency is set such as to satisfy the relationship mentioned above, at a time of executing.

(Action of Precise Measurement Mode)

Figure 7:
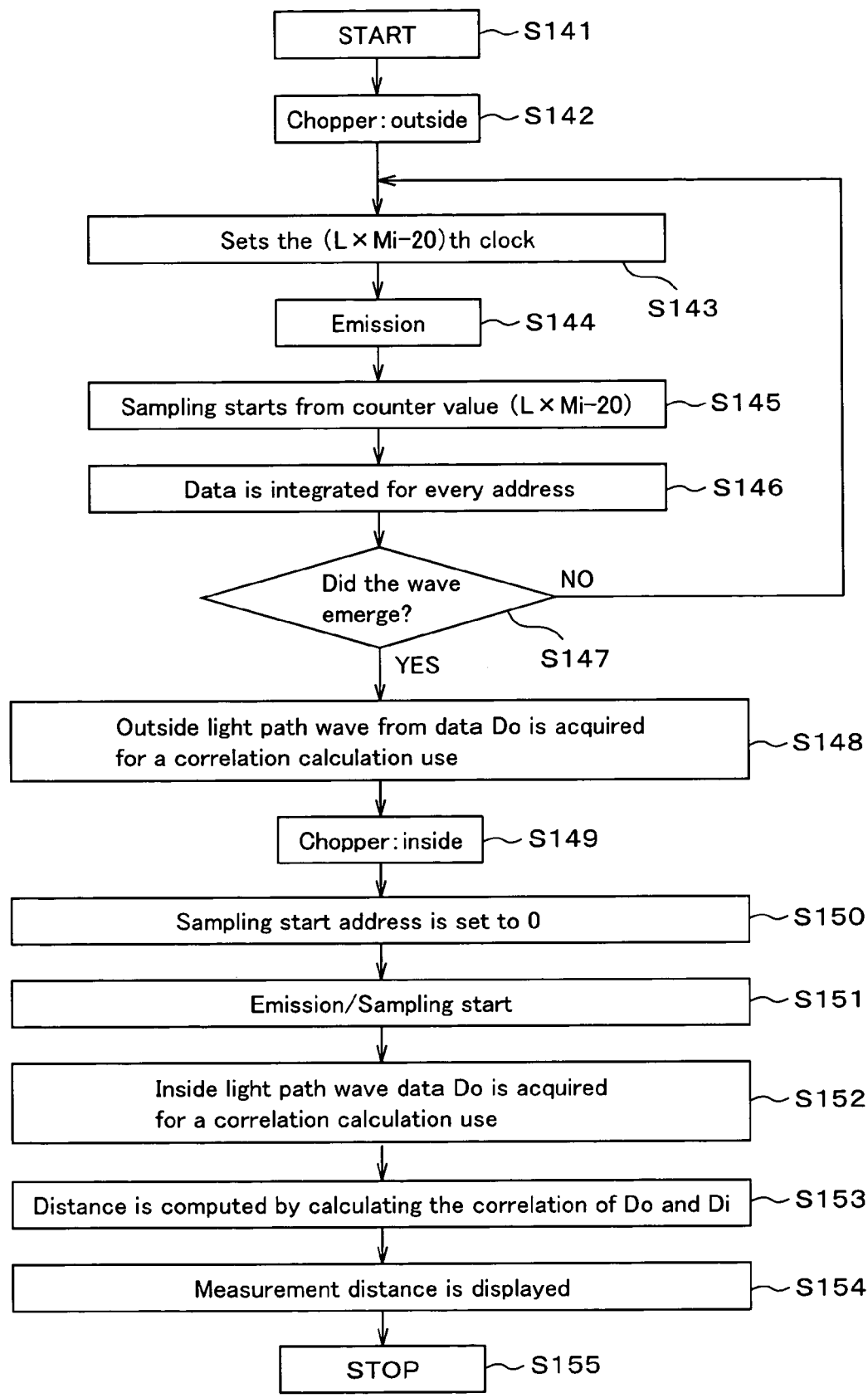
FIG. 7 is a flow chart showing one example of the procedure of the light wave distance measurement.

Next, a description will be given of a motion of the precise measurement mode in accordance with the present embodiment. FIG. 7 is a flow chart showing an example of a processing procedure of the precise measurement mode. In the rough measurement mode in FIG. 5, when the rough distance information is obtained and the distance range for executing the measurement in the precise measurement mode is designated thereby, the mode is changed to the precise measurement mode shown in FIG. 7.

When the process in the precise measurement mode is started (step S141), the light shutter 106 is first released, the light shutter 117 is closed, and the state "chopper: outside" is selected (step S142). Next, the step sets the (L×Mi−20) clock scale division of the sampling start timing in the precise measurement mode determined in the step S138 in FIG. 5 (a step S143). Furthermore, the step emits the laser pulsed light at a predetermined timing (step S144), and starts the sampling on the basis of a counter value set in the step S143 (step S145). Furthermore, the step accumulates the sampling data in accordance with the method mentioned below (step S146), and judges whether or not the wave form generated on the basis of the sampled data emerges (that is, the predetermined S/N ratio is obtained) (step S147). If the wave form has emerged, the step goes to step S148, and if not, the steps S143 and below are repeated. In the step S148, the data of the obtained wave form is acquired as an outside light path wave form data Do.

Next, the light shutter 106 is closed, the light shutter 117 is released, and a state "chopper: inside" in which the inside reference light path 111 is utilized is set (step S149). Next, the step sets the sampling start address to 0 (step S150), and starts the light emission from the light emitting element 104, and the sampling of the output wave form of the tuning amplifier 114 responding to the output of the light receiving element 113 (step S151). In this case, since the wave form having the high S/N ratio is easily obtained, the wave form is acquired as an inside light path wave form data Di (step S152).

Furthermore, the step calculates the distance in accordance with a method mentioned below by using a correlation between the outside light path wave form data Do and the inside light path wave form data Di (step S154), displays the value on a suitable display apparatus (for example, a liquid crystal display (not shown) or the like) (step S154), and finishes the process (step S155).

(Processing of Data in Precise Measurement Mode)

A description will be given in detail below of contents of the processing in the step S146 in FIG. 7. In this aspect, the process of emerging the output signal wave form from the tuning amplifier is executed by overlapping the sampling data of a plurality of pulses.

Figure 8A:
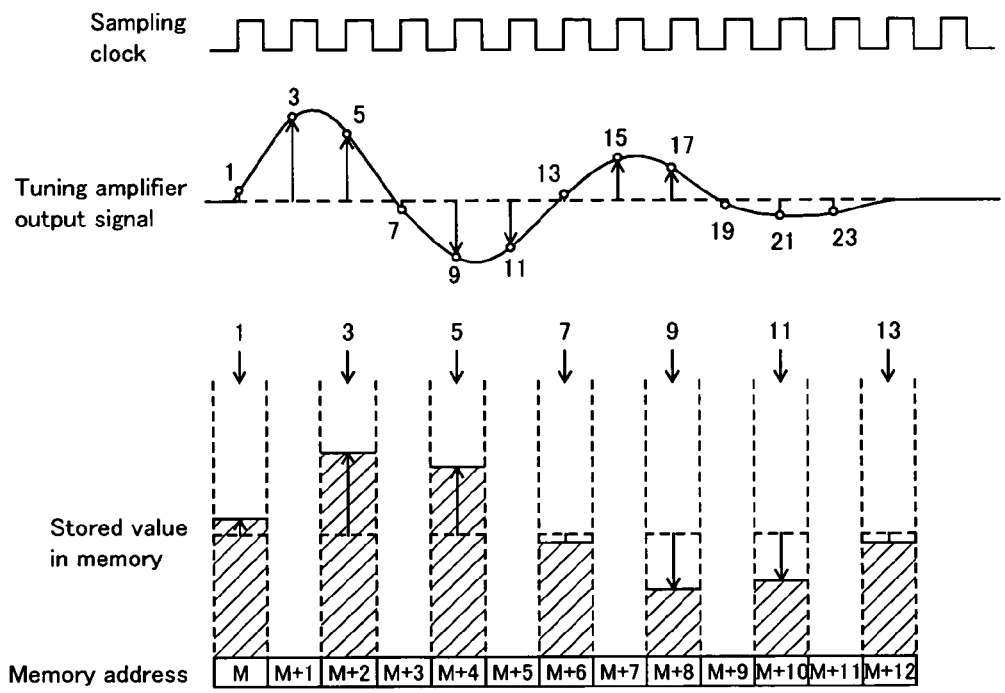
FIG. 8 is a conceptual diagram explaining the combining method of sampling data.
Figure 8B:
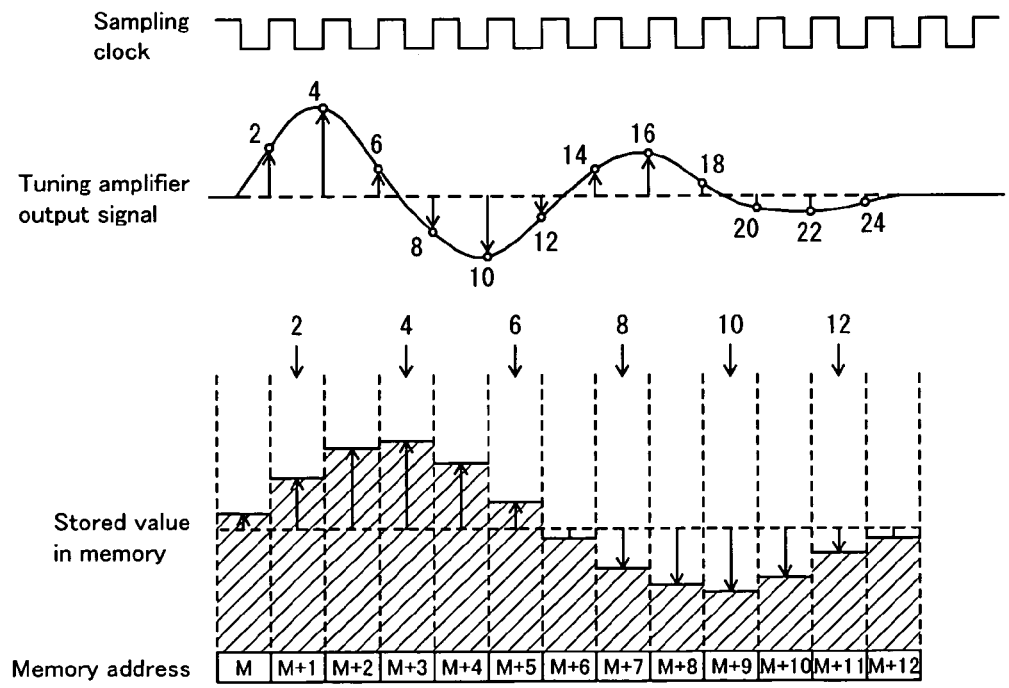

FIG. 8 is a conceptual view for explaining a sampling method in the precise measurement mode in accordance with the present embodiment. FIG. 8A shows a process timing of the first light emission (the odd pulse), and FIG. 8B shows a process timing of the second light emission (the even pulse).

In the present embodiment, the step samples the output signal of the tuning amplifier 114 responding to the reflection pulsed light for the first pulse on the basis of the timing relationship shown in FIG. 8A, and stores it in a predetermined memory address. In other words, the step stores the sampling data alternately in the memory addresses such as storing the sampling data of the sampling point 1 in the memory address M, storing the sampling data of the sampling point 3 in the memory address M+2 and storing the sampling data of the sampling point 5 in the memory address M+4. In other words, the first pulse acquires the sampling data at the odd position of the damped oscillation wave form.

In this case, the address number which is synchronized with the sampling clock is applied within the memory within the adding and storing portion 123 (refer to FIG. 4). In this case, the numeric value is applied sequentially by setting the measurement start point to 0.

After executing the process shown in FIG. 8A, the step executes the sampling of the output signal from the tuning amplifier 114 in correspondence to the reflected light at the second pulse on the basis of the timing relation shown in FIG. 8B. In this sampling, the sampling of the damped oscillation wave form from the tuning amplifier 114 is executed at the sampling point of the even position, by using the sampling clock which is shifted 180 degrees in phase in comparison with the case of FIG. 8A.

In other words, the step stores the sampling data at the even positions alternately in the memory addresses such as storing the sampling data of the sampling point 2 in the memory address M+1, storing the sampling data of the sampling point 4 in the memory address M+3 and storing the sampling data of the sampling point 6 in the memory address M+5. In other words, the second pulse acquires the sampling data at the even position of the damped oscillation wave form.

As a result, as shown in FIG. 8B, the data obtained by A/D converting the damped oscillation wave form from the tuning amplifier 114 is stored in the memory. The data accurately reflects the relationship between the amplitude and the phase of the damped oscillation wave form, and forms data suitable for calculating the precise distance. However, in this state, the enhancing process of the peak value which is explained in detail by using FIG. 6 is not executed, and the improvement of the S/N ratio obtained in the rough measurement mode is not executed. Accordingly, in the case in which the reflected pulsed light is weak, it is impossible to obtain the S/N ratio at a degree which can calculate the distance.

Then, the processes of the third pulse and the fourth pulse are executed in accordance with the same method as the method shown in FIG. 8, and the result of sampling is added to the data of the first pulse and the second pulse, thereby executing the accumulating process of the sampling data. In other words, the step adds the sampling data of the first light emission and the sampling data of the third light emission, and adds the sampling data of the second light emission and the sampling data of the fourth light emission while aligning the phases. It is possible to enhance the peak value of the wave form data which is stored in the memory and A/D converted, by repeating the process at the third and fourth light emissions and the fifth and sixth light emissions.

The accumulating process of the sampling data can be executed by using 2N number of pulses. Since the process uses a plurality of pulses, a lot of processing time is required; however, it is possible to reproduce the wave form which accurately reflects the relationship between the amplitude and the phase of the damped oscillation wave form from the tuning amplifier 114. Therefore, this process is useful for calculating the precise position.

(Calculating Method of Distance)

A description will be in detail given below of one example of the process in the step S153 in FIG. 7. The outside light path wave form data Do and the inside light path wave form data Di include the information relating to the elapsed time after the light emission, and the information relating to the relationship between the amplitude and the phase of the damped oscillation wave form output from the tuning amplifier 114. The distance is calculated on the basis of the light emission timing and the light receiving timing of the pulsed light, and the speed of the light.

However, the output from the tuning amplifier includes an error in accordance with the motion delay of the circuit, and an error caused by an influence of a humidity characteristic of the circuit constant constituting the tuning amplifier, as a drift component. Accordingly, the drift component is cancelled by comparing the outside light path wave form data Do with the inside light path wave form data Di.

The calculation of the precise distance can be executed in a significantly precise manner, for example, by determining the position of the gravity point of the damped oscillation wave form output from the tuning amplifier 114.

Operation and Effect of Embodiment 1

In accordance with the embodiment 1 described above, it is possible to obtain the advantage of the rough measurement mode which is not suitable for the precise measurement of the distance, which however, can measure the distance in a short time, and the advantage of the precise measurement mode which requires a long measuring time, however, can obtain a precise measurement, in a synergetic manner, and it is possible to executed the measurement of the precise distance in a short time while the measurement range is wide.

In other words, the rough distance is determined in accordance with the rough measurement mode in which the S/N ratio is improved by accumulating the sampling data of one reflected pulsed light by the time axis, and the precise measurement of the distance in accordance with the precise measurement mode is next executed in the narrow range determined in accordance with the rough measurement mode. At this time, since the measurement range is narrowed in the precise measurement mode, the disadvantage of the precise measurement mode can be restricted to a level generating no problem, even by accumulating the sampling data of a plurality of reflected pulsed lights and utilizing the precise measurement mode having the improved S/N ratio.

2. Modification of Embodiment 1 (Modification 1)

In the precise measurement mode in accordance with the embodiment 1, the frequency of the sampling clock may be made higher in comparison with the frequency in the rough measurement mode. In the embodiment 1, since the measurement range of the precise measurement mode is narrowed, the problem that the processing time is increased and the large memory capacity is required is not actualized even in the case of making the sampling frequency high. In this case, it is possible to make the measuring accuracy in the precise measurement mode high.

3. Modification of Embodiment 1 (Modification 2)

In the embodiment 1, the distance data may be calculated by utilizing the result of the rough measurement mode. In this case, in the same manner as the procedure shown in FIG. 7, it is preferable to remove the drift component by using the inside light path wave form data Di. In this case, the preciseness of the measured data is sacrificed; however, it is possible to calculate the distance on the basis of the process for a short time. Furthermore, if the structure is made such that the rough measurement mode and the precise measurement mode can be manually switched, it is possible to achieve the structure which can change to the precise measurement mode in the case in which it is desired to execute the distance measurement in accordance with the high speed process under the rough measurement mode and further execute the precise distance measurement.

4. Modification of Embodiment 1 (Modification 3)

Figure 9A:
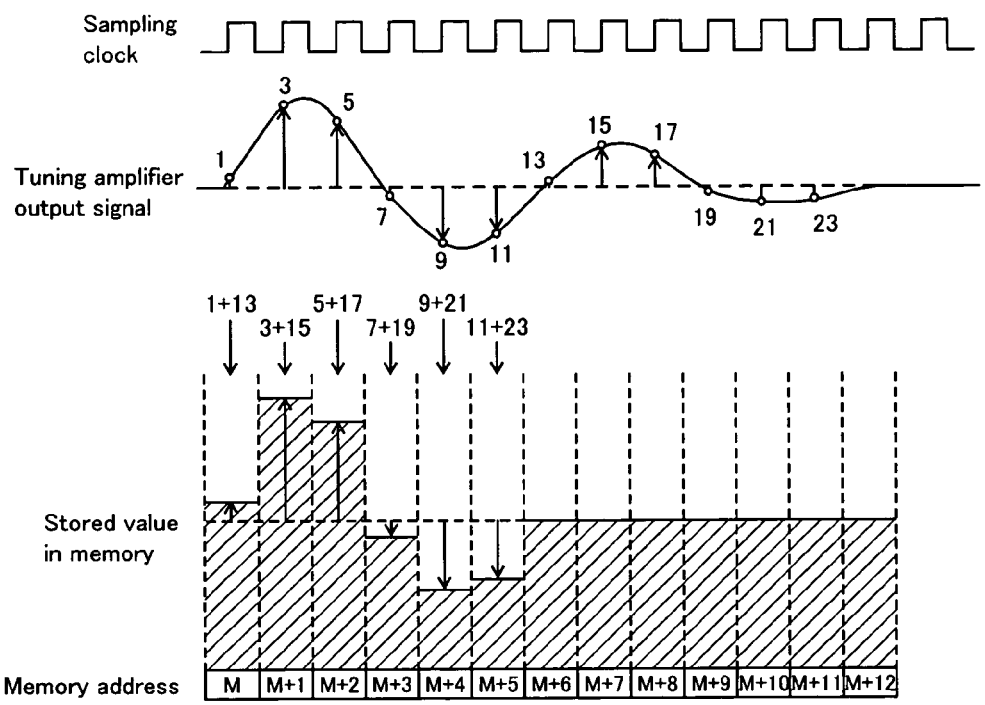
FIG. 9 is a conceptual diagram explaining the combining method of sampling data.
Figure 9B:
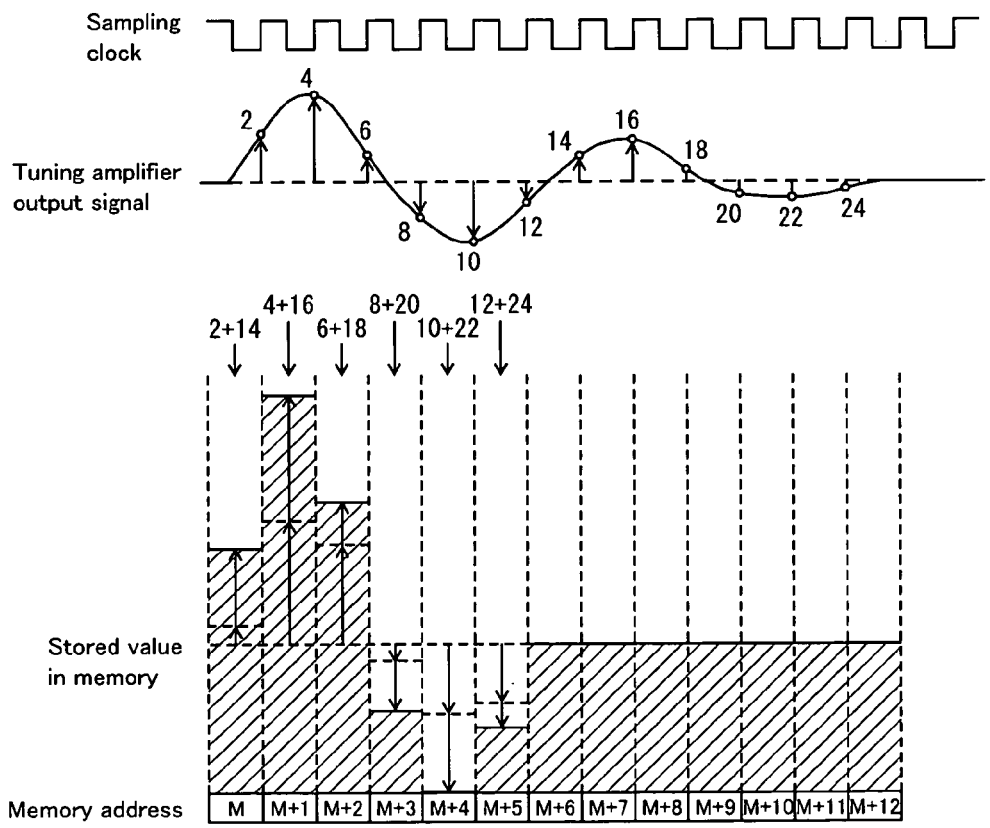

A description will be given of another example of the method of improving the S/N ratio by utilizing the damped oscillation wave form output from the tuning amplifier. FIG. 9 is a conceptual diagram showing another sampling method of the output signal of the tuning amplifier. FIG. 9A shows a sampling timing at a first light emission, and FIG. 9B shows a sampling timing at a second light emission.

This embodiment is the same as the embodiment 1 in the point that the periodicity of the damped oscillation wave form is utilized; however, it executes a process of adding the sampling data of the first reflected pulsed light and the sampling data of the second reflected pulsed light, thereby further enhancing the peak value of the damped oscillation wave form.

In other words, as shown in FIG. 9A, the step executes the process of sampling the damped oscillation wave form responding to the reflected pulsed light of the first light emission at the sampling point 1 and the sampling point 13, adding both the data so as to be stored in the memory address M, further sampling at the sampling point 3 and the sampling point 15, adding both the data so as to be stored in the memory address M+1, . . . .

Furthermore, the step executes the process for sampling the damped oscillation wave form responding to the reflected pulsed light of the second light emission at the sampling point 2 and the sampling point 14, adding both the data so as to be stored in the memory address M after further adding to the stored data of the first light emission, further adding the sampling data at the sampling point 4 and the sampling point 16 so as to be stored in the memory address M+1 after further adding to the stored data of the first light emission, . . . .

In this embodiment, it is possible to obtain an overlapping effect of the peak portions of the damped oscillation wave form responding to one pulse, and an overlapping effect of the amplitude data of two pulse lights, in a synergetic manner. Accordingly, as is seen in the stored data shown in FIG. 9B, it is possible to greatly enlarge the effect of enhancing the peak value of the basic damped oscillation wave form.

5. Modification of Embodiment 1 (Modification 4)

Figure 10A:
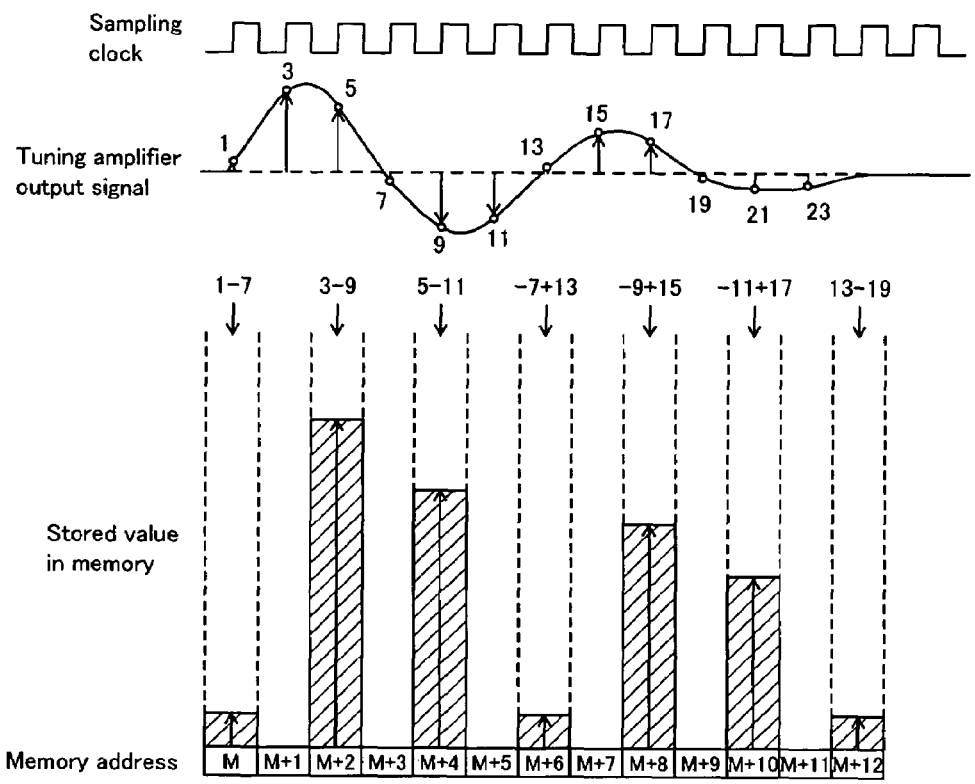
FIG. 10 is a conceptual diagram explaining the combining method of sampling data.
Figure 10B:
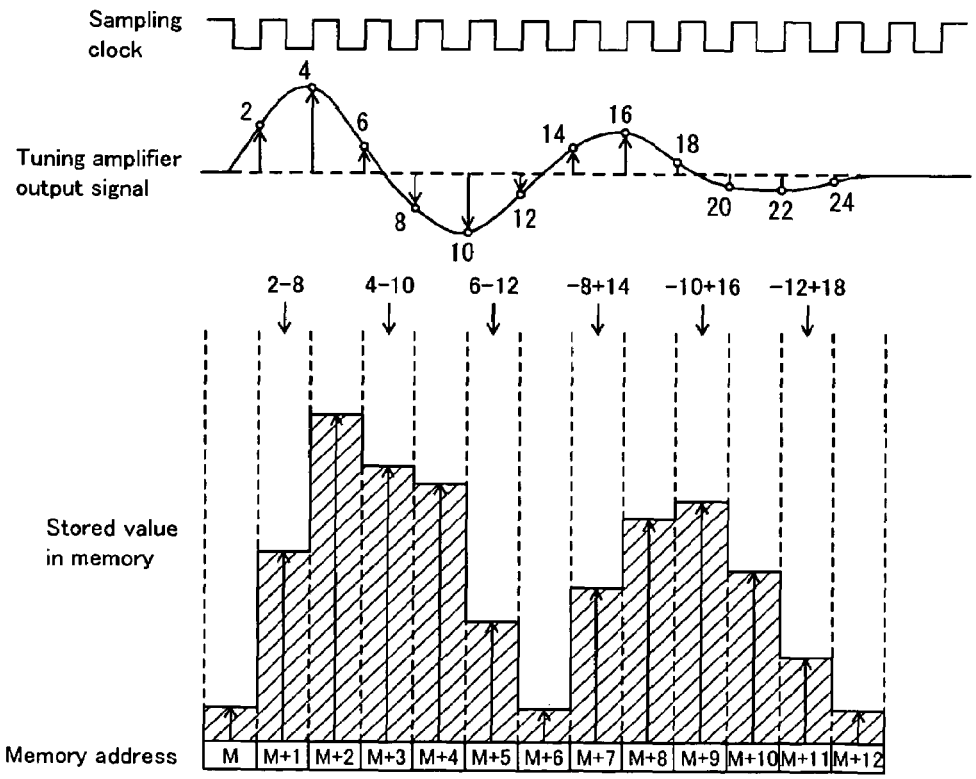

A description will be given of another example of the method of improving the S/N ratio by utilizing the damped oscillation wave form output from the tuning amplifier. FIG. 10 is a conceptual diagram showing another sampling method of the output signal of the tuning amplifier. FIG. 10A shows a sampling timing at a first light emission, and FIG. 10B shows a sampling timing at a second light emission.

This embodiment is the same as the embodiment 1 in the point that the periodicity of the damped oscillation wave form is utilized; however, it executes a combination of the sampling data on the basis of a half cycle ($\pi$ radian) of the damped oscillation wave form. In other words, with respect to the damped oscillation wave form responding to the reflected pulsed light at the first light emission, the step executes the process of adding the absolute values of the sampling data at the sampling point 1 and the sampling data at the sampling point 7, storing the value in the memory address M, adding the absolute values of the sampling data at the sampling point 3 and the sampling data at the sampling point 9, storing the value in the memory address M+2, adding the absolute values of the sampling data at the sampling point 5 and the sampling data at the sampling point 11, storing the value in the memory address M+4, . . . .

Furthermore, with respect to the damped oscillation wave form responding to the reflected pulsed light at the second light emission, the step executes the process of adding the absolute values of the sampling data at the sampling point 2 and the sampling data at the sampling point 8, storing the value in the memory address M+1, adding the absolute values of the sampling data at the sampling point 4 and the sampling data at the sampling point 10, storing the value in the memory address M+3, adding the absolute values of the sampling data at the sampling point 6 and the sampling data at the sampling point 12, storing the value in the memory address M+5, . . . .

Since the sampling data at the sampling points which are separated by a half cycle, have reverse sign amplitudes, the sampling data in the negative side is used by reversing the sign thereof. In accordance with the present embodiment, since the absolute values of the amplitude of the damped oscillation wave form in the direction of the time axis are accumulated and the peak value is enhanced, it is possible to enhance the detecting sensitivity of the pulsed signal.

The present embodiment relates to the process of utilizing the periodicity of the damped oscillation wave form and enhancing the peak value thereof, and can be considered as the process that the wave form is enhanced by adding the sampling value of the peak portion of the damped oscillation wave form and the value obtained by reversing the sign of the sampling value of the trough portion, or the process that the wave form is enhanced by summing the area of the crest portion of the damped oscillation wave form and the area of the trough portion.

6. Modification of Embodiment 1 (Modification 5)

In the embodiment shown in FIG. 10, the sampling point combining the sampling value may be in another order or combination than that mentioned above. In this case, it is set such that in the case in which the sampling value is negative (that is, the sampling value having the negative amplitude of the damped oscillation wave form), the value obtained by reversing the sign thereof is utilized. Furthermore, the sampling point accumulating the sampling values selects, for example, a plurality of continuous points.

In accordance with this structure, it is possible to accumulate the amplitude values of the positive side wave forms (the peak portions) of the damped oscillation wave form output from the tuning amplifier, accumulate the amplitude value of the positive side wave form (the peak portion) and the absolute value (the value obtained by reversing the sign) of the amplitude value of the negative side wave form (the trough portion), and accumulate the amplitude values of the negative side wave forms, whereby the peak value of the damped oscillation wave form can be enhanced.

7. Other Embodiments

Figure 1A:
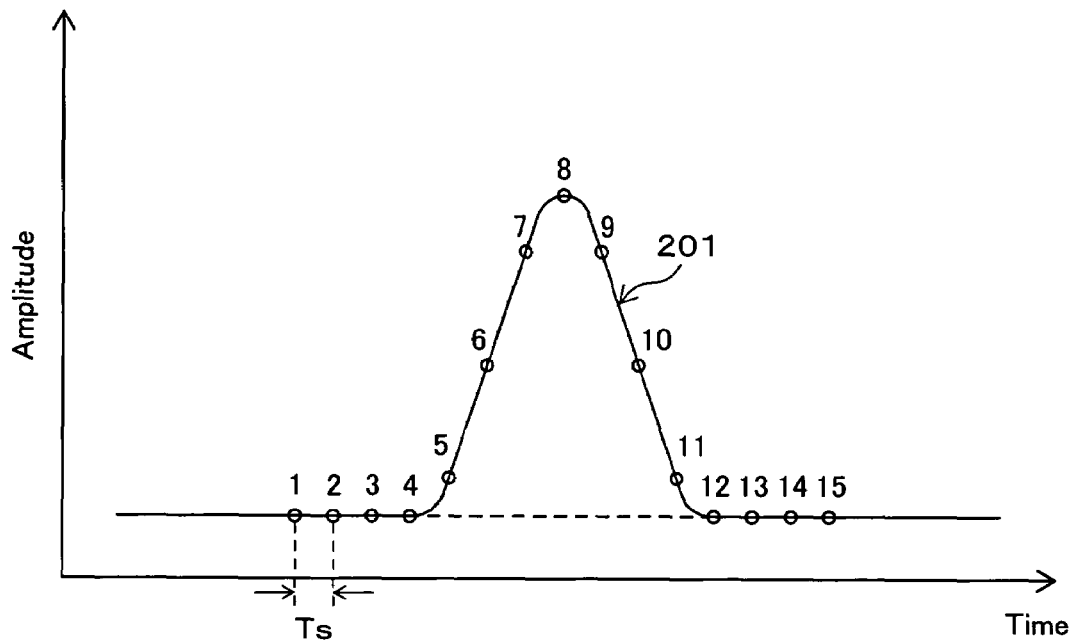
FIG. 1 is a graph explaining a principle for executing a sampling of a pulsed signal.
Figure 1B:
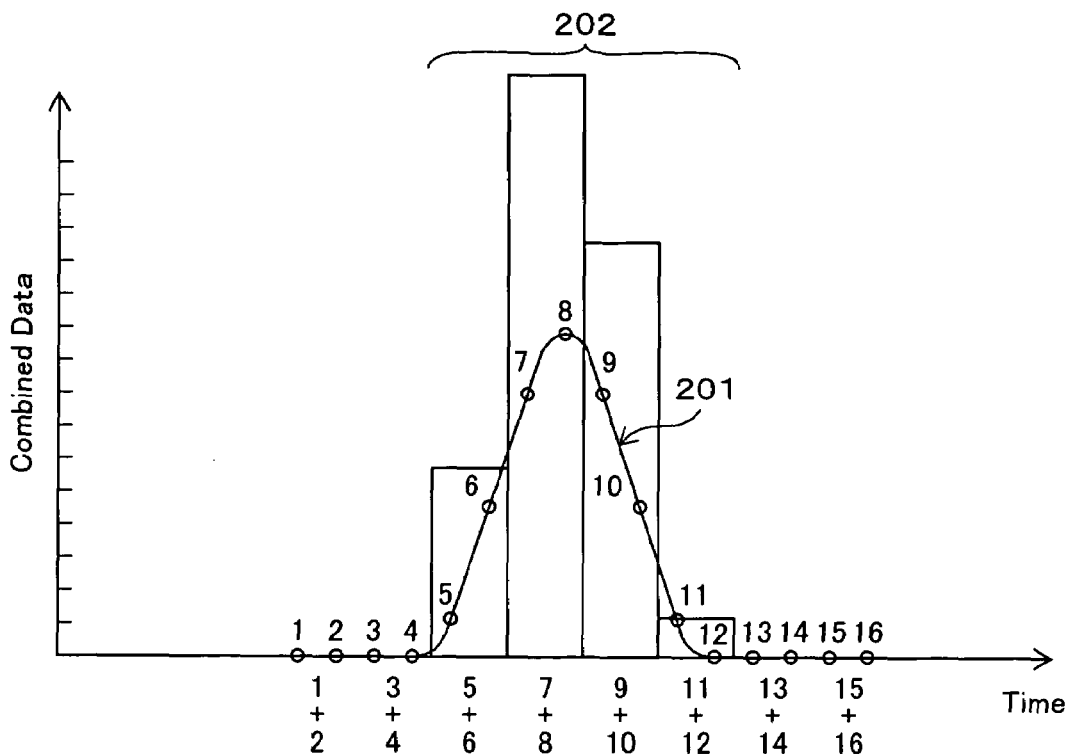

The present embodiment corresponds to an example in the case in which the sampling is executed by using the output signal from the light receiving element receiving the reflected pulsed light as it is. In the present embodiment, for example, in the system shown in FIG. 3, an amplifying amplifier is simply arranged in place of the tuning amplifier. The method of sampling executes a process of adding the sampling data of the adjacent sampling points and enhancing the amplitude value, for example, with respect to the pulsed wave form as shown in FIG. 1. The number of the sampling position for addition is not limited to two positions, but may be equal to or more than three positions. Furthermore, the sampling positions for addition do not have to be adjacent, however; it is desirable that they be positioned close to each other.

What is claimed is:

1. A processing apparatus for a pulsed signal comprising:
   a sampling portion for sampling one pulsed signal;
   a converting portion for converting the sampled one pulsed signal to a response signal having a periodicity responding to the signal at a predetermined timing;
   an adding portion for combining a plurality of the sampled sampling data by utilizing the periodicity of the response signal and aligning phases thereof; and
   a memory portion for storing the combined data in a predetermined address,
   wherein the data stored in the memory portion is constituted by a data enhancing a level of the pulsed signal.

2. The processing apparatus for a pulsed signal as claimed in claim 1, wherein the combined sampling data is acquired from a nearby sampling position.

3. The processing apparatus for a pulsed signal as claimed in claim 1, wherein the response signal is constituted by a signal obtained by converting the pulsed signal into a damped oscillation wave form.

4. The processing apparatus for a pulsed signal as claimed in claim 3, wherein in the combination, there are executed accumulation of amplitude values of a plurality of peak portions in the damped oscillation wave form, and accumulation of amplitude values of a plurality of trough portions.

5. The processing apparatus for a pulsed signal as claimed in claim 3, wherein in the combination, there are executed summing of areas of the peak portions in the damped oscillation wave form, and summing of areas of the trough portions.

6. The processing apparatus for a pulsed signal as claimed in claim 3, wherein in the combination, there is executed an addition of amplitude values of the peak portions in the damped oscillation wave form, and values obtained by reversing signs of amplitude values of trough portions.

7. The processing apparatus for a pulsed signal as claimed in claim 3, wherein in the combination, there is executed a summing of areas of the peak portions in the damped oscillation wave form, and areas of the trough portions.

8. The processing apparatus for a pulsed signal as claimed in claim 3, wherein in the combination, there is executed an addition of sampling data at sampling points which are apart at a phase difference of $2\pi$ of the damped oscillation wave form.

9. The processing apparatus for a pulsed signal as claimed in claim 3, wherein in the combination, there is executed an addition of absolute values of sampling data at sampling points which are apart at a phase difference of $\pi$ of the damped oscillation wave form.

10. The processing apparatus for a pulsed signal as claimed in claim 3, wherein the damped oscillation wave form has a relationship of approximately integral multiples of the sampling interval.

11. The processing apparatus for a pulsed signal as claimed in claim 1, wherein the pulsed signal is constituted by an output signal from a light receiving element receiving the pulsed light, the pulsed light is constituted by a reflected light of an irradiated pulsed light irradiated to a predetermined object, and the apparatus is further provided with a light generating portion of the irradiated pulsed light, and a distance calculating portion for calculating a distance from the light receiving element to the object by utilizing the combined data and the irradiation timing of the irradiated pulsed light.

12. The processing apparatus for a pulsed signal as claimed in claim 11, wherein the apparatus is provided with a switch portion for changing a mode between a rough measurement mode for executing the sampling in a first distance measurement range, and a precise measurement mode for executing a sampling of an output signal from the light receiving element in a second distance measurement range narrower than the first distance measurement range.

13. The processing apparatus for a pulsed signal as claimed in claim 12, wherein the sampling with respect to a plurality of pulsed lights is executed in the precise measurement mode, and the sampling data with respect to the plurality of pulses are accumulated.

14. The processing apparatus for a pulsed signal as claimed in claim 12, wherein the sampling frequency in the precise measurement mode is higher than the sampling frequency in the rough measurement mode.

15. The processing apparatus for a pulsed signal as claimed in claim 12, wherein the switch portion switches the mode from the rough measurement mode to the precise measurement mode, in the case in which the second distance measurement range is determined by the rough measurement mode.

16. A processing method for a pulsed signal, comprising:
    a sampling step of sampling one pulsed signal;
    a converting step for converting the sampled one pulsed signal to a response signal having periodicity responding to the signal at a predetermined timing;
    an adding step of combining a plurality of the sampled sampling data by utilizing the periodicity of the response signal and aligning phases thereof; and
    a memory step of storing the combined data in a predetermined address,
    wherein the data stored in the memory step is constituted by a data enhancing a level of the pulsed signal.

17. A signal processing system comprising:
    a processor in communication with a memory, wherein the memory is configured to store executable procedures and wherein the executable procedures are executable by the processor, the computer executable procedures comprising:
    a sampling procedure of sampling one pulsed signal;
    a conversion procedure of converting the sampled one pulsed signal to a response signal having periodicity responding to the pulsed signal at a predetermined timing;
    an adding procedure of combining a plurality of the sampled sampling data by utilizing the periodicity of the response signal and aligning phases thereof; and
    a memory procedure of storing the combined data in a predetermined address,
    wherein a process of enhancing a level of the pulsed signal on the basis of the data added in the adding procedure is executed by the computer.

* * * * *